United States Patent [19]
Ushiro

[11] Patent Number: 5,679,990
[45] Date of Patent: Oct. 21, 1997

[54] MOTOR

[75] Inventor: Tatsuzo Ushiro, Kawaguchi, Japan

[73] Assignee: Canon Kabushiki Kaisha, Tokyo, Japan

[21] Appl. No.: 359,839

[22] Filed: Dec. 20, 1994

[30] Foreign Application Priority Data

Dec. 27, 1993 [JP] Japan .................. 5-331778

[51] Int. Cl.$^6$ ..................................... H02K 1/22
[52] U.S. Cl. ............... 310/68 B; 310/156; 324/174
[58] Field of Search .................. 310/156, 68 B; 324/173, 174, 160

[56] References Cited

U.S. PATENT DOCUMENTS

| | | | |
|---|---|---|---|
| 4,109,170 | 8/1978 | Fujita et al. | 310/68 R |
| 4,501,997 | 2/1985 | Müller | 318/254 |
| 4,551,676 | 11/1985 | Amemiya et al. | 324/208 |
| 4,746,862 | 5/1988 | Ueki | 324/208 |
| 4,801,830 | 1/1989 | Ogino et al. | 310/68 B |
| 4,902,924 | 2/1990 | Ushiro et al. | 310/268 |
| 5,101,131 | 3/1992 | Ushiro et al. | 310/258 |
| 5,408,153 | 4/1995 | Imai et al. | 310/68 B |

FOREIGN PATENT DOCUMENTS

| | | | |
|---|---|---|---|
| 52-51512 | 4/1977 | Japan | H02K 23/66 |
| 63-188717 | 8/1988 | Japan | G01D 5/245 |

*Primary Examiner*—Thomas M. Dougherty
*Attorney, Agent, or Firm*—Fitzpatrick, Cella, Harper & Scinto

[57] ABSTRACT

A motor includes a rotor magnet, driving coils and the detecting wire elements. The rotor magnet is mounted on a rotor yoke and has a plurality of magnetic pole pairs arranged at equal angular spacings, each having north and south poles. At least one pair of is unequally magnetized so that the north and south poles thereof are of unequal strength. The other magnetic pole pairs are equally magnetized so that the north and south poles thereof are of equal strength. The driving coils are provided on a stator yoke opposite from the rotor magnet. The detecting wire elements are provided on the stator yoke. The detecting wire elements are arranged at an angular spacing substantially equal to that of the magnetic pole pairs of the rotor magnet. The detecting wire elements generate output signals when the rotor yoke comprising the rotor magnet rotates to cause the unequally magnetized magnetic pole pair to move across from the detecting wire elements.

6 Claims, 4 Drawing Sheets

MOTOR

BACKGROUND OF THE INVENTION

1. Field of the Invention

The present invention relates to a flat brushless motor for detecting a rotational phase of a motor.

2. Description of the Related Art

Conventionally, speed detection of a motor (hereinafter abbreviated as FG) has been performed by a combination of a separate magnet exclusive for FG which rotates coaxially with a motor output shaft and a detecting pattern, or by a combination of the separate magnet and a magnetic field detecting sensor. In recent years, however, in the field of brushless motors, a configuration of FG apparatus has become popular which is integral with a motor such that a detection device is provided opposite to a disk-shaped rotor magnet of multipolar magnetization for driving a motor to generate an induction voltage, as disclosed in Japanese Unexamined Patent Publication No. 52-51512(counter part of U.S. Pat. No. 4,109,170). Similarly, in conventional position detection (hereinafter abbreviated as PG) for detecting a position or rotational phase of a motor, a magnet exclusive for PG is mounted on a motor so as to be detected by detecting coils or a magnetic field detecting sensor. In place of this conventional arrangement, however, as disclosed in Japanese Unexamined patent publication No. 63-188717, projections for PG are provided on a part of a motor-driving rotor magnet to be detected by a detecting pattern and detecting coils. For the known motor- integral-type apparatus as described above, a method of position detecting has been proposed in which one magnetic pole of the rotor magnet having multipolar magnetization is sub-divided into two sections each having half the pole angle, the sections being evenly magnetized, in place of providing PG projections. The sub-divided rotor magnet is detected by the PG detecting pattern.

In recent years, however, materials used for the rotor magnet have been changed from those of the ferrite family to high energy materials such as those of the neodymium family. Thus, the conventional motor, in which a half pitch island-like magnetization exists on one of the magnetic poles of the rotor magnet, has the problem that the magnetized yokes are difficult to manufacture and can not be sufficiently magnetized. That is, since the range of the island-like magnetization becomes remarkably narrowed as the motor is reduced in size, it becomes difficult to sufficiently magnetize the high energy magnet materials. According to the conventional motor having the configuration as described above, an output signal is obtained which is at a much lower level than that of the predetermined PG output, and the waveform of the output signal does not show distinct peaks. Therefore, the conventional motor has not been put to practical use.

SUMMARY OF THE INVENTION

It is an object of the present invention to provide a motor capable of obtaining at least one phase detection signal per one rotation thereof in response to a variation in magnetic flux which occurs with the rotation of a rotor magnet.

It is another object of the present invention to provide a motor which has a rotor magnet having a plurality of magnetic pole pairs, at least one of which has north and south magnetic pole sections which are unequally magnetized, wherein output signals are generated as this magnetic pole pair move across from the detecting wire elements.

According to an aspect, the present invention which achieves at least one of these objectives relates to a motor comprising a rotor magnet, driving coils, and detecting wire elements. The rotor magnet is mounted on a rotor yoke and has a plurality of magnetic pole pairs arranged at equal angular spacings. Each pair has north and south poles. At least one pair is unequally magnetized so that the north and south poles thereof are of unequal strength. The other magnetic pole pairs are equally magnetized so that the north and south poles thereof are of equal magnetic strength. The driving coils are provided on a stator yoke opposite from the rotor magnet. The detecting wire elements are provided on the stator yoke. The detecting wire elements are arranged at an angular spacing substantially equal to that of the magnetic pole pairs of the rotor magnet. The detecting wire elements generate output signals when the rotor yoke comprising a rotor magnet rotates to cause the unequally magnetized magnetic pole pair to move across from the detecting wire elements.

The plurality of magnetic pole pairs comprise four magnetic pole pairs together having a total of eight north and south poles. Each magnetic pole pair extends over an angular spacing of 90°. The angular extent of the north and south pole sections of the unequally magnetized magnetic pole pair is such that no substantial counter torque is generated. Moreover, half the difference in the angular extent between the north pole section and the south pole section of the unequally magnetized magnetic pole pair is such that the phase difference between the output signals from the detecting wire elements is shifted by no more than 30 electrical degrees from the phase difference that exists when the difference in the angular extent between the north and south pole sections of the unequally magnetized pole pair is zero.

According to another aspect, the present invention which achieves at least one of these objectives are relates to a motor comprising a stator yoke, a rotor yoke provided opposite to the stator yoke, a rotor magnet, driving coils, and a base plate. The rotor magnet is mounted on the rotor yoke and has a plurality of magnetic pole pairs each arranged at an equal angular spacing. One magnetic pole pair is unequally magnetized so that the north and south poles thereof are of unequal strength. The other magnetic pole pairs are equally magnetized so that the north and south poles thereof are of equal strength. The driving coils are provided on the stator yoke, which is positioned opposite to the rotor magnet. The base plate is provided on the stator yoke and has a position detecting pattern. The position detecting pattern of the base plate has detecting wire elements arranged at angular spacings substantially equal to those of the magnetic pole pairs of the rotor magnet. The detecting wire elements generate output signals when the rotor yoke having the rotor magnet rotates to cause the one magnetic pole pair of unequal magnetization to move across from the detecting wire elements.

The motor is adapted for use in a cylinder device of a magnetic recording/reproducing apparatus having a magnetic head. In this embodiment the output signals generated from the detecting wire elements are position detecting signals for detecting a rotational phase of the magnetic head of the magnetic recording/reproducing apparatus.

Further objects of the present invention will become apparent from the following description of the preferred embodiments.

DETAILED DESCRIPTION OF THE PREFERRED EMBODIMENTS

An embodiment of the present invention will be described with reference to the accompanying drawings.

Figure 1:
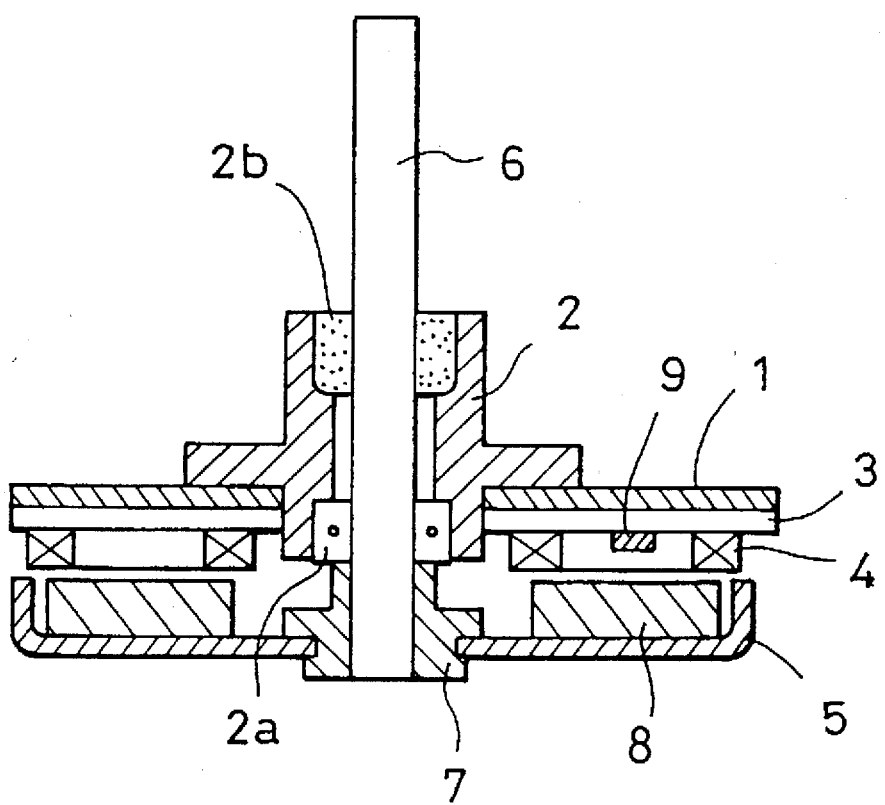
FIG. 1 illustrates a cross-sectional view of a brushless motor according to one embodiment of the present invention.

FIG. 1 illustrates a configuration of a brushless motor. Referring to FIG. 1, a stator yoke 1 is mounted on a housing 2 having a ball bearing 2a and a metal bearing 2b. A plurality of spiral driving coils 4 are circumferentially arranged on the stator yoke 1 through a base plate 3. A rotor yoke 5 is arranged opposite to the stator yoke 1, and is held by a rotary shaft 6 through a bush 7. A disk-shaped multipolar magnetized rotor magnet 8 is fixed to the rotor yoke 5 opposite to the driving coils 4. A Hall element 9 adheres to the stator yoke 1 and detects a rotational phase of the rotor magnet 8. Therefore, when a current is switchingly supplied to the driving coils 4 at predetermined timings in accordance with the output of the Hall element 9, a rotating torque is generated to rotate the rotor yoke 5.

Figure 2:
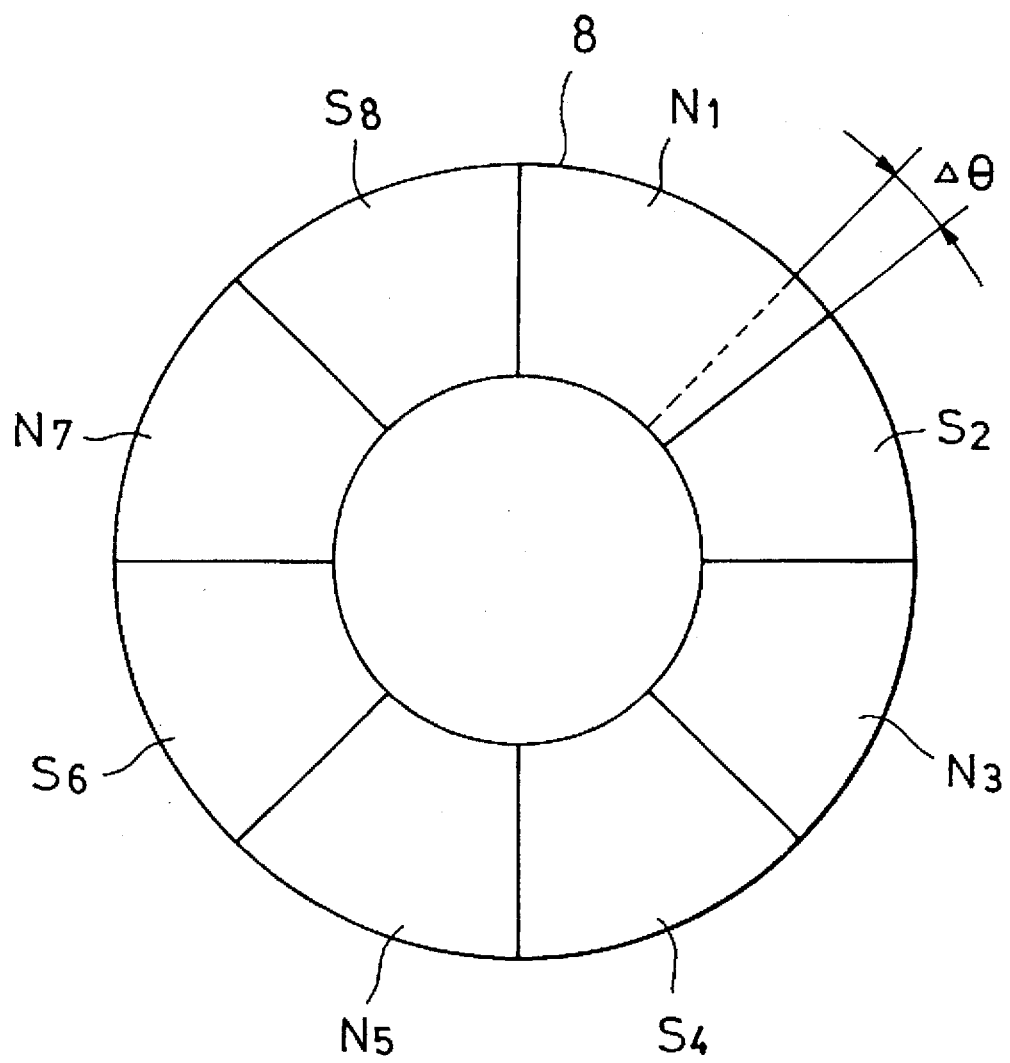
FIG. 2 is a plan view of a rotor magnet shown in FIG. 1.

FIG. 2 specifically shows the rotor magnet 8 shown in FIG. 1. The rotor magnet 8 includes a plurality of magnetic pole pairs of N poles and S poles, for example, four magnetic pole pairs each arranged at an equal angular spacing of 90°. The rotor magnet 8 having four magnetic pole pairs is divided into eight sections in alternate order of N poles and S poles from $N_1$ to $S_8$. The north and south pole sections of at least one magnetic pole pair have a different magnetization from each other, while the other magnetic pole pairs are equally magnetized. That is to say, each of the north and south pole sections of magnetic pole pairs $N_3$ and $S_4$, $N_5$ and $S_6$, and $N_7$ and $S_8$ extend over an angular spacing of 45°, while the line that would otherwise divide magnetic pole pairs $N_1$ and $S_2$ into two sections each extending over 45° is shifted by an angle of $\Delta\theta$. $\Delta\theta$ is equal to half the difference in the angular extent of the north and south pole sections of the unequally magnetized magnetic pole pair. As a result, the north pole $N_1$ and the south pole $S_2$ are of unequal magnetic strength, while the north and south poles of magnetic pole pairs $N_3$ and $S_4$, $N_5$ and $S_6$, and $N_7$ and $S_8$ are of equal magnetic strength.

Figure 3:
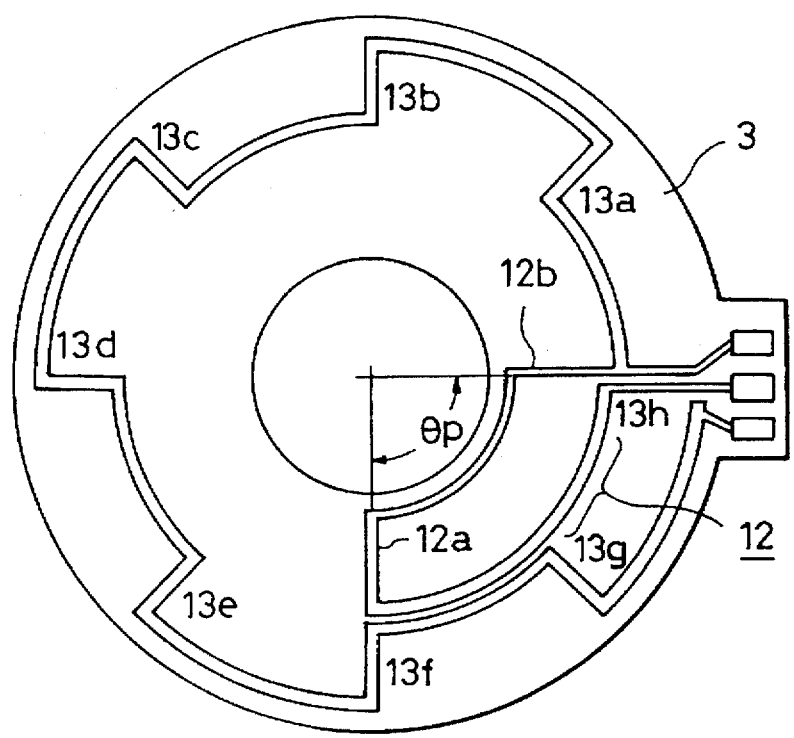
FIG. 3 illustrates a plan view of a base plate shown in FIG. 1 having speed detection patterns and phase detection patterns thereon.

As shown in FIG. 3, a PG pattern 12, as a position detecting pattern, is arranged on the base plate 3 at a stator side opposite from the rotor magnet 8 and has detecting wire elements 12a, 12b. The detecting wire elements 12a, 12b are arranged at an angular spacing of 90° equal to that of one magnetic pole pair of the rotor magnet 8.

Figure 4A:
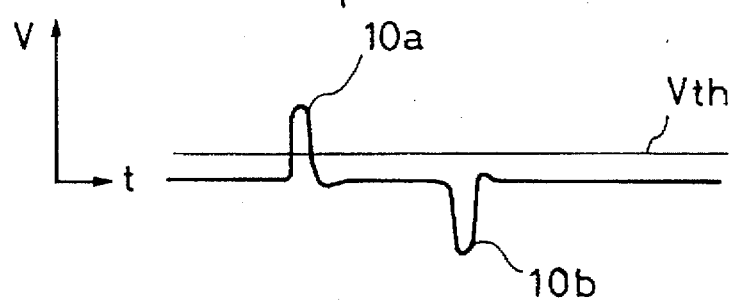
FIG. 4(a) is a waveform diagram showing a detecting signal of a phase detection pattern shown in FIG. 3.
Figure 4B:
FIG. 4(b) is a waveform pattern of the detection signal shown in FIG. 4(a) which exceeds a predetermined level.

In an arrangement as described above, when the disc-shaped rotor magnet 8 is rotated, both detecting wire elements 12a, 12b detect north and south magnetic fields of equal strength as they pass pairs $N_3$–$S_4$, $N_5$–$S_6$, and $N_7$–$S_8$. Thus, no output signal is obtained from detecting wire elements 12a, 12b. However, when the magnetic poles $N_1$ and $S_2$ in the rotor magnet 8, which are unequally divided, move across the PG pattern 12, the detecting wire elements 12a and 12b detect north and south magnetic fields of unequal strength, thereby causing an output signal to be generated in detecting wire elements 12a, 12b. The signal obtained is shown in FIG. 4(a) (in the figure, the peaks indicated by reference numerals 10a and 10b correspond to the detecting wire elements 12a and 12b, respectively). By setting a predetermined threshold level $V_m$ and only detecting signals exceeding the level, one PG signal is detected per one rotation in such a manner as shown in FIG. 4(b).

Of course, when a plurality of unequally divided sections are provided, a plurality of PG signals can be obtained. If the angle of $\theta_p$ defining the angular extent between wire elements 12a, 12b is set in an integral multiple of spacing angle of one magnetic pole pair, for example, an angle of 90°, 180° or 270°, the PG signal similar to that described above can be detected. The base 3 also comprises detecting wire elements 13a to 13h opposed to the rotor magnet 8. Wire elements 13a to 13h define speed detecting patterns for obtaining speed detection FG signals generated upon rotation of the rotor magnet 8 and the generation of an induction voltage which occurs in response to such rotation.

Further, the PG pattern 12 need not be flush with the FG pattern. In this embodiment, the rotor magnet 8 has eight magnetic poles. However, the number of magnetic poles is not limited thereto, and the rotor magnet 8 may have six or twelve magnetic poles.

It is preferable that the angle $\Delta\theta$ of the rotor magnet 8 is such that the phase difference between the output signals from detecting wire elements 12a and 12b is shifted by an amount not greater than 30 electrical degrees from the phase difference that exists when $\Delta\theta$ is 0, so as to prevent the generation of a substantial counter torque upon rotation of the motor 8. For example, when the angle $\Delta\theta$ is set within 7.5° i.e. one sixth of the angular extent of a magnetic pole pair, (45°/6) in the rotor magnet 8 having eight magnet poles, a large torque fluctuation is not generated, and it has little effect on a nonuniform rotation of the motor or the like.

Figure 5:
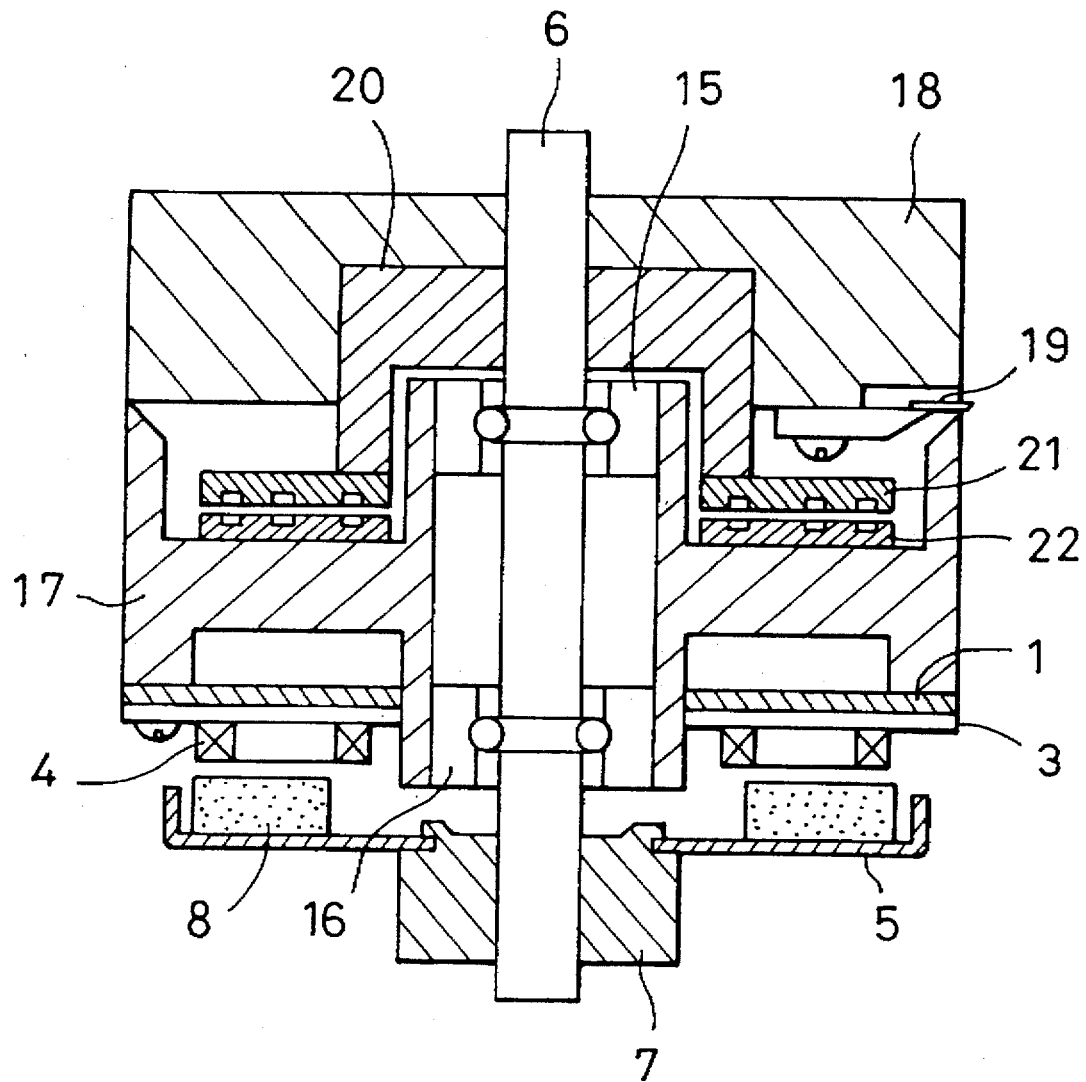
FIG. 5 illustrates a cross-sectional view of a brushless motor shown in FIG. 1 as applied to a cylinder device of a magnetic recording/reproducing apparatus.

FIG. 5 illustrates a brushless motor shown in FIG. 1 as applied to a cylinder device of a magnetic recording/reproducing apparatus. In the drawing, the same components as those shown in FIG. 1 are indicated by the same reference numerals.

A rotary shaft 6 is rotatably supported by ball bearings 15, 16 fixed to a stationary lower cylinder 17. A rotatable upper cylinder 18 having a magnetic head 19 mounted thereon at the predetermined position and phase against a transformer bed 20 is coaxially fitted to and fixed on the rotary shaft 6.

Rotary transformers 21 and 22 facing each other are arranged on a rotation side and a fixed side, respectively, of the motor for delivering picture signals or the like in a noncontacting manner.

Referring to FIG. 5, a motor section (not shown) for rotating the upper cylinder 18 is provided at a lower side of the lower cylinder 17. The multipolar magnetized rotor magnet 8 (FIG. 1) adheres to the rotor yoke 5, the rotor yoke 5 is caulked by the bush 7 and the bush 7 is pressed to the rotary shaft 6 to be fixed thereto.

The base plate 3 having a stator yoke 1 forming a magnetic circuit, a phase detecting pattern 12 (PG pattern in FIG. 3), and speed detecting pattern (FIG. 3) formed thereon is provided opposite to the rotor magnet 8. The driving coils 4 are arranged on the base plate 3. Detection of a rotational phase of the rotor magnet 8 and passing current suitably through the driving coils 4 allow a torque to be generated, thereby rotating the upper cylinder 18 through the rotary shaft 6.

At this time, if the unequally divided magnetic pole pair of $N_1$ and $S_2$ of the rotor magnet 8 is detected by the detecting pattern 12 to generate PG signals, a rotational phase of the magnetic head 19 can be detected.

As has been described above, according to the present invention, it becomes possible to detect PG without providing a specific PG projections and PG magnetization.

And, according to the present invention, the present design does not limit the size of the motor, thereby enabling a reduction in size of the motor. Further, since magnetic field varies greatly, it is not necessary to consider bringing the detecting pattern close to the PG section, thereby increasing the structural degree of freedom.

What is claimed is:

1. A motor comprising:

a rotor magnet mounted on a rotor yoke and having a plurality of magnetic pole pairs arranged at equal angular spacings, each pair having north and south poles, at least one pair being unequally magnetized so that the north and south poles thereof are of unequal strength, wherein the other magnetic pole pairs are equally magnetized so that the north and south poles thereof are of equal strength;

driving coils provided on a stator yoke opposite from said rotor magnet; and detecting wire elements provided on said stator yoke, said detecting wire elements being arranged at an angular spacing substantially equal to that of the magnetic pole pairs of said rotor magnet, and generating output signals when the rotor yoke comprising said rotor magnet rotates to cause said unequally magnetized magnetic pole pair to move across from said detecting wire elements, wherein said rotor magnet, said detecting wire elements, and said driving coils together comprise means for generating output signals in said detecting wire elements having a phase difference of no more than 30 electrical degrees from the phase difference of output signals generated in identical detecting wire elements of an identical motor identical to said motor except that each of the magnetic pole pairs is equally magnetized so that the north and south poles thereof are of equal strength.

2. A motor according to claim 1, wherein said plurality of magnetic pole pairs comprises four magnetic pole pairs and wherein each magnetic pole pair extends over an angular spacing of 90°.

3. A motor according to claim 1, wherein the angular extent of the north and south pole sections of said unequally magnetized magnetic pole pair is such that no substantial counter torque is generated.

4. A motor according to claim 3, wherein half the difference in the angular extent between the north pole section and the south pole section of the unequally magnetized magnetic pole pair is such that the phase difference between the output signals from said detecting wire elements is shifted by no more than 30 electrical degrees from the phase difference that exists when the difference in the angular extent between north and south pole sections of the unequally magnetized magnetic pole pair is zero.

5. A motor comprising:

a stator yoke;

a rotor yoke provided opposite to said stator yoke;

a rotor magnet mounted on a rotor yoke and having a plurality of magnetic pole pairs each arranged at an equal angular spacing, wherein one magnetic pole pair is unequally magnetized so that the north and south poles thereof are of unequal strength, and wherein the other magnetic pole pairs are equally magnetized so that the north and south poles thereof are of equal strength;

driving coils provided on said stator yoke which is positioned opposite to said rotor magnet; and a base plate provided on said stator yoke having a position detecting pattern, the position detecting pattern of said base plate having detecting wire elements arranged at angular spacings substantially equal to those of magnetic pole pairs of said rotor magnet, said detecting wire elements generating output signals when said rotor yoke having said rotor magnet rotates to cause said one magnetic pole pair of unequal magnetization to move across from said detecting wire elements, wherein said rotor magnet, said detecting wire elements, and said driving coils together comprise means for generating output signals in said detecting wire elements having a phase difference of no more than 30 electrical degrees from the phase difference of output signals generated in identical detecting wire elements of an identical motor identical to said motor except that each of the magnetic pole pairs is equally magnetized so that the north and south poles thereof are of equal strength.

6. A motor according to claim 5, wherein said motor is adapted for use in a cylinder device of a magnetic recording/reproducing apparatus having a magnetic head, and wherein the output signals generated from said detecting wire elements are position detecting signals for detecting a rotational phase of a magnetic head of the magnetic recording/reproducing apparatus.

* * * * *